(No Model.)
J. F. NACHTRIEB.
HOSE COUPLING.
No. 411,829. Patented Oct. 1, 1889.
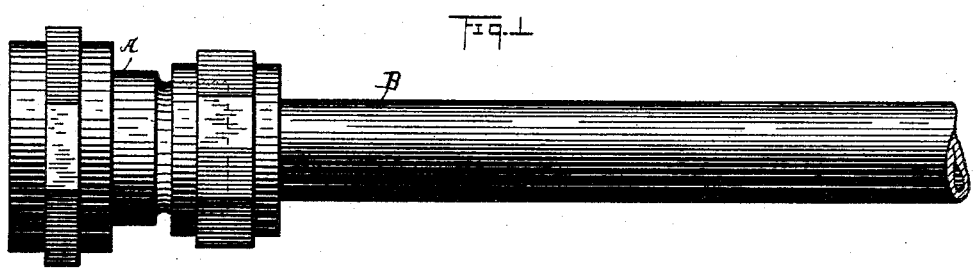
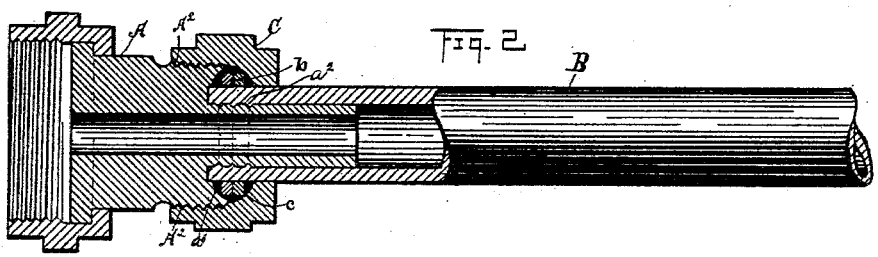
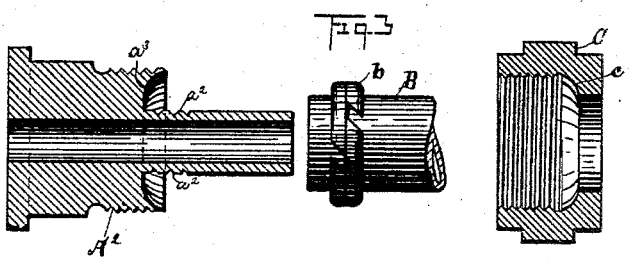
Witnesses.
B. S. Lowrie.
Chas. R. Phillips.
Inventor
John F. Nachtrieb
By
Leggett & Leggett,
Attorneys.

UNITED STATES PATENT OFFICE.

JOHN F. NACHTRIEB, OF CLEVELAND, OHIO.

HOSE-COUPLING.

SPECIFICATION forming part of Letters Patent No. 411,829, dated October 1, 1889.

Application filed May 1, 1889. Serial No. 309,244. (No model.)

*To all whom it may concern:*

Be it known that I, JOHN F. NACHTRIEB, of Cleveland, in the county of Cuyahoga and State of Ohio, have invented certain new and useful Improvements in Hose-Coupling; and I do hereby declare the following to be a full, clear, and exact description of the invention, such as will enable others skilled in the art to which it pertains to make and use the same.

My invention relates to improvements in hose-coupling or coupling for soft-metal pipe; and it consists in certain features of construction, and in combination of parts, hereinafter described, and pointed out in the claim.

In the accompanying drawings, Figures 1 and 2 are corresponding plans, the latter being partly in section. Fig. 3 is a plan, partly in section, showing the different members disconnected.

A represents a coupling adapted to connect, for instance, with a faucet, or with an opposing coupling, and has a nozzle $A'$ for entering hose or pipe B, a section of this nozzle having a series of external circumferential grooves $a^2$. Member $A'$ has a section $A^2$ screw-threaded externally for engaging the internally-screw-threaded cap C. The end of the hose or pipe is supposed to abut shoulder $a$ of the coupling, and the hose has mounted thereon two external cut rings $b$, arranged side by side, but in position to break joints where they are cut. Members A and C have conical seats, respectively, $a^3$ and $c$, adapted to embrace and compress rings $b$ by means of screwing the cap home, and by compressing these rings the hose or pipe B is compressed and made to grasp the grooved section of the nozzle with great firmness. The rings or bands $b$ may be of any suitable material—such, for instance, as brass, hard rubber, &c.

The device is inexpensive, but is found to be very effective, and it requires little trouble and no skilled labor to attach or detach the hose from the coupling.

What I claim is—

In hose-coupling, in combination, the body of the coupling having a nozzle for entering the hose, and having an external screw-threaded section, a cap for clamping the hose, cut rings mounted on the hose opposite the nozzle, the body of the coupling and the cap having, respectively, opposing conical seats adapted to embrace and compress the cut rings by screwing the cap home, whereby the compression of the rings clamps the hose on the nozzle, substantially as set forth.

In testimony whereof I sign this specification, in the presence of two witnesses, this 2d day of March, 1889.

JOHN F. NACHTRIEB.

Witnesses:
CHAS. H. DORER,
ALBERT E. LYNCH.